United States Patent
Hsieh et al.

[15] 3,676,407

[45] July 11, 1972

[54] TETRAPOLYMERS AND PROCESS FOR PRODUCTION THEREOF

[72] Inventors: Henry L. Hsieh; Ollie G. Buck, both of Bartlesville, Okla.

[73] Assignee: Phillips Petroleum Company

[22] Filed: Sept. 23, 1970

[21] Appl. No.: 74,844

[52] U.S. Cl. ................260/77.5 R, 156/331, 260/37 N, 260/77.5 AM, 260/830 R, 260/830 P, 260/859 PV
[51] Int. Cl. .................................................C08g 22/00
[58] Field of Search.....................260/77.5 R, 77.5 AM

[56] References Cited

UNITED STATES PATENTS

| | | | |
|---|---|---|---|
| 3,317,480 | 5/1967 | Fetscher et al. | 260/77.5 |
| 3,488,297 | 1/1970 | Aggias | 260/77.5 R |

*Primary Examiner*—Donald E. Czaja
*Assistant Examiner*—M. J. Welsh
*Attorney*—Young and Quigg

[57] ABSTRACT

Tetrapolymers, which can be used as adhesives and as terminating agents for lithium initiated polymerizations, are prepared by polymerizing a mixture of an oxirane, a cyclic ether, an organic acid anhydride, and a monoisocyanate in the presence of an organometal compound.

9 Claims, No Drawings

TETRAPOLYMERS AND PROCESS FOR PRODUCTION THEREOF

This invention relates to tetrapolymers. It further relates to the production of tetrapolymers. It specifically relates to the reaction of a cyclic ether, an organic acid anhydride, an oxirane, and a monoisocyanate in the presence of trialkylaluminum to produce a tetrapolymer.

It is known by those skilled in the art that an acid anhydride and an oxirane react in the presence of organometal to produce a copolymer. It was not heretofore known, however, that a tetrapolymer can be produced by reacting an acid anhydride, an oxirane, a cyclic ether, and a monoisocyanate in the presence of organometal.

It is thus an object of our invention to provide such a tetrapolymer.

It is a further object of our invention to provide a method for preparing such a tetrapolymer.

In accordance with our invention, we have discovered a novel composition of matter, specifically a tetrapolymer prepared by the reaction of four different compounds consisting of a cyclic ether, an organic acid anhydride, an oxirane, and a monoisocyanate. The composition of the tetrapolymer is defined in terms of the molar ratio of the cyclic ether to the organic acid anhydride to the oxirane, and the weight ratio of the monoisocyanate to the combined weights of the cyclic ether, the organic acid anhydride, and the oxirane. Thus, the molar ratio of the cyclic ether to the organic acid anhydride to the oxirane is in the range from 0.1:1:0.6 to 1:1:1.4, preferably, from 0.5:1:0.8 to 1:1:1.2, and still more preferably the molar ratio is 1:1:1. The weight ratio of the monoisocyanate to the combined weights of the cyclic ether, the organic acid anhydride and the oxirane is in the range from 1 to 80, preferably 10 to 40, parts by weight monoisocyanate per 100 parts by weight of the combined weights of the cyclic ether, the organic acid anhydride and the oxirane.

The cyclic ethers useful herein are cyclic mono- and polyethers and can be selected from both saturated and unsaturated 4- and 5-member ring configurations. The preferred cyclic ethers are the 1,3 and 1,4-epoxides which are represented by the general formula

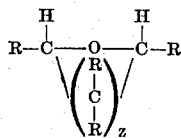

wherein R is selected from the group consisting of hydrogen, chloromethyl, bromomethyl, and alkyl radicals having one to six carbon atoms, and z is the integer 1 or 2. It is not required that each R in the above-defined formula be the same as every other R in the formula. Examples of preferred cyclic ethers within the scope of the above formula which can be used herein include trimethylene oxide, 3,3-bis(chloromethyl) oxetane, tetramethylene oxide (tetrahydrofuran) and the like.

The organic acid anhydride useful herein is saturated or unsaturated and can contain substituents such as alkyl, alkenyl, alkoxy, nitro, halo, and the like. The preferred organic acid anhydrides are cyclic carboxylic acid anhydrides, examples of which include malonic anhydride, succinic anhydride, glutaric anhydride, adipic anhydride, pimelic anhydride, glutaconic anhydride, maleic anhydride, phthalic anhydride, tetrachlorophthalic anhydride, 3-nitrophthalic anhydride, allylsuccinic anhydride, pyromellitic dianhydride, chloroendic anhydride, endic anhydride, and the like. Mixtures of these compounds, saturated, unsaturated or both, can be used.

The oxirane useful herein can be saturated or unsaturated and mixtures thereof can be employed. Oxiranes containing in the range of 2 to 20 carbon atoms per molecule can be used in the formation of the tetrapolymer of this invention and are represented by the following formula:

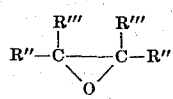

wherein each R'' and R''' is selected from the group consisting of hydrogen, saturated aliphatic, saturated cycloaliphatic, monoolefinic aliphatic, diolefinic aliphatic, monoolefinic cycloaliphatic, diolefinic cycloaliphatic and aromatic radicals and combinations of these such as aralkyl, alkaryl, and the like. Some or all of the R'' and R''' radicals can also be halogen-substituted and can contain oxygen in the form of an acyclic ether linkage (—O—) or another oxirane group

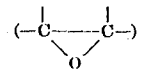

In addition, both R''' radicals can represent a divalent aliphatic hydrocarbon radical which, together with the carbon atoms of the oxirane group, can form a cycloaliphatic hydrocarbon nucleus containing from about four to about 10 carbon atoms, preferably from about four to about eight carbon atoms.

Specific examples of some oxiranes which are within the above structural formula and which can be utilized in accordance with this invention are ethylene oxide (epoxy ethane); 1,2-epoxypropane (propylene oxide); 1,2-epoxybutane; 2,3-epoxybutane; 2,3-epoxypentane; 1,2-epoxyhexane; 3,4-epoxyhexane; 1,2-epoxyheptane; 2,3-epoxyoctane; 2,3-dimethyl-2,3-epoxypentane; 1,2-epoxy-4-methylpentane; 2,3-epoxy-5-methylhexane; 1,2-epoxy-4,4-dimethylpentane; 4,5-epoxyeicosane; 1-chloro-2,3-epoxypropane (epichlorohydrin); 1-bromo-2,3-epoxypropane; 1,5-dichloro-2,3-epoxypentane; 2-iodo-3,4-epoxybutane; styrene oxide;6-oxybicyclo[3.1.0]hexane; 7-oxybicyclo[4.1.0]heptane; 3-propyl-7-oxabicyclo-[4.1.0]heptane; bis(2,3-epoxybutyl)ether; tert-butyl 4,5-epoxyhexyl ether; 2-phenylethyl 3,4-epoxybutyl ether and the like.

Unsaturated oxiranes within the above structural formula, including ethers, which can be utilized in accordance with this invention include allyl 2,3-epoxypropyl ether (allyl glycidyl ether); allyl 3,4-epoxybutyl ether; 1-methallyl 3,4-epoxyhexyl ether; 3-hexenyl 5,6-epoxyhexyl ether; 2,6-octadienyl 2,3,7,8-diepoxyoctyl ether; 6-phenyl-3-hexenyl 2-ethyl-5,6-epoxyhexyl ether; 3,4-epoxy-1-butene (butadiene monoxide); 3,4-epoxy-1-pentene; 5-phenyl-3,4-epoxy-1-pentene; 1,2,9,10-diepoxy-5-decene; 6,7-di-n-butyl-3,4,9,10-diepoxy-1,11-dodecadiene; epoxy vinyl ether; allyl 2-methyl-2,3-epoxypropyl ether; 3-cyclohexyl-2-propenyl 4-cyclohexyl-3,4-epoxybutyl ether; 2,4-pentadienyl 2,3-diethyl-3,4-epoxybutyl ether; 1-methallyl 6-phenyl-3,4-epoxyhexyl ether; 5-(4-tolyl)2,3-epoxypentyl vinyl ether; bis[4-(3-cyclopentenyl)2,3-epoxybutyl]-ether; 2-(2,4-cyclohexadienyl)ethyl 2,3-epoxybutyl ether; 2-(2,5-cyclohexadienyl)-ethyl 2-benzyl-4,5-epoxypentyl ether; 3,4-epoxy-1,5-hexadienyl isopropyl ether; allyl 3,4-dimethyl-3,4-epoxyhexyl ether; 3,4-epoxy-4-( 2,3-dimethylphenyl)1-butene; 3,4-dimethyl-3,4-epoxy-1-pentene; 5-(4-methylcyclohexyl)3,4-epoxy-1-pentene; 4,5-diethyl-4,5-epoxy-2,6-octadiene; 4-(2,4-cyclopentadienyl)1,2,6,7-diepoxyheptane; and 1-phenyl-1,2-epoxy-5,7-octadiene, and the like.

The monoisocyanate useful in this invention is represented by the general formula R⁴NCO wherein R⁴ is a radical containing from two to 20 carbon atoms. R⁴ can be an alkyl, cycloalkyl, aryl, or alkenyl radical or combination thereof. While it is preferred that R⁴ be a hydrocarbyl radical it is possible to employ compounds bearing nonreactive substituents on the R⁴ radical such as alkoxy, nitro, halogen, and the like.

Examples of suitable monoisocyanates include ethyl isocyanate; eicosyl isocyanate; cyclohexyl isocyanate; phenyl isocyanate; benzyl isocyanate; 4-methylphenyl isocyanate; cyclododecyl isocyanate; 3-phenylcyclopentyl isocyanate; 1-octyl isocyanate; 2-ethyl-1-hexyl isocyanate; 1-naphthyl isocyanate; 1-hexyl isocyanate, and the like.

The preferred constituents of the tetrapolymer of this invention include phthalic anhydride or succinic anhydride as the organic acid anhydride constituent, tetrahydrofuran as the cyclic ether constituent, ethylene oxide, propylene oxide or eipchlorohydrin as the oxirane constituent and phenylisocyanate as the monoisocyanate constituent.

According to the process by which the tetrapolymer is prepared it can vary from a low melting friable solid material to a soft thermoplastic product of varying molecular weight. Further, it is within the scope of this invention to add to the tetrapolymer fillers such as carbon black, clay or silica, stabilizers, pigments, extenders and plasticizers such as are commonly employed in compounding plastics or elastomers.

The tetrapolymer is produced by polymerizing a mixture of the cyclic ether, the organic acid anhydride, the oxirane and the monoisocyanate in the presence of an organometal compound which is a catalyst for the polymerization. One method for conducting the polymerization reaction comprises charging a suitable vessel such as a reactor with the above described four reactants in amounts within the above-mentioned molar and weight ratios, thereafter introducing into the reaction vessel a suitable diluent for the reaction and then introducing therein the catalyst. The polymerization reaction is then conducted at temperatures ranging from 30° to 500° F., preferably in the range from 70° to 300° F. The time for polymerization can vary over a wide range and is generally dependent upon the temperature employed. Normally, the time is in the range from approximately 1 minute to more than 240 hours, preferably from 10 minutes to 50 hours. After the polymerization has proceeded for a desired length of time, it can be terminated by the addition of a catalyst inactivating agent. Any suitable method conventionally used to inactivate organometal catalysts such as by the addition of a protonic acid or an alcohol such as isopropyl alcohol can be used. The product can then be separated by conventional means such as steam stripping or coagulation with a nonsolvent for the tetrapolymer and dried.

The organometallic compound used in preparing the tetrapolymer can be represented by the formula $R^5{}_n MX_m$ wherein each $R^5$ is a saturated aliphatic, a saturated cycloaliphatic hydrocarbon radical, or a combination thereof containing from one to 20 carbon atoms; M is calcium, magnesium, zinc, cadmium, aluminum, gallium, indium, thallium, silicon or tin; X is hydrogen, fluorine, chlorine, bromine, iodine or $OR^5$; $n$ is an integer from 1 to 4; $m$ is an integer from 0 to 4 when X is $OR^5$ and from 0 to 3 when X is hydrogen or a halogen; and $n$ and $m$ equal the valence of the metal M. An optional cocatalyst can be used with the organometallic compound in preparing the tetrapolymer. The mole ratio of optional cocatalyst to organometallic compound is in the range of 0.001:1 to 1:1, preferably 0.2:1 to 0.5:1. Specific examples of the optional cocatalysts are water, alcohols, or a complexing agent such as a beta-diketone or a metal salt thereof, such as zinc acetylacetonate. Catalysts within the scope of the above definition which are preferred for use herein include trialkyl aluminum, trialkyl aluminum/water, and trialkyl aluminum/zinc acetylacetonate/water. The preferred catalyst is triisobutylaluminum.

The catalyst level can be expressed in terms of the moles of organometal per mole of organic acid anhydride, thus the catalyst is present in the range of 0.01 to 0.2, preferably 0.02 to 0.1, moles organometal per mole organic acid anhydride.

In the preferred method of preparing these tetrapolymers, an excess amount of cyclic ether is used in the reaction mixture, as the cyclic ether can also serve as a diluent for the reaction. Other useful diluents include hexane, cyclohexane, benzene, toluene and the like.

The tetrapolymers of this invention are suitable for use as sealants, caulking compounds, adhesives, gaskets, potting compounds for industrial components and the like.

The tetrapolymer of this invention can be used as a terminating agent for polymerizations initiated with lithium based initiators. Monomers used in the polymerizations initiated with a lithium based catalyst are polymerizable hydrocarbons such as conjugated dienes or vinyl-substituted aromatic compounds. The conjugated dienes ordinarily contain from four to 12 carbon atoms per molecule and those containing from four to eight carbon atoms are preferred. Examples of such compounds include 1,3-butadiene, isoprene, 2,3-dimethyl-1,3-butadiene, piperylene, 3-butyl-1,3-octadiene, 2-phenyl-1,3-butadiene and the like. The vinyl substituted aromatic compounds include styrene, 1-vinylnaphthalene, 2-vinylnaphthalene and the alkyl, cycloalkyl aryl, alkaryl, and aralkyl derivatives thereof in which the total number of carbon atoms in the combined substituents is generally not greater than 12. Examples of such vinyl-substituted aromatic monomers include 3-methylstyrene, 4-n-propylstyrene, 4-cyclohexylstyrene, 4-dodecylstyrene, 2-ethyl-4-benzylstyrene, 4-(4-phenyl-n-butyl)styrene and the like. The conjugated dienes and the vinyl-substituted aromatic compounds can be polymerized alone or in admixture to form homopolymers, copolymers or block copolymers. The tetrapolymer is added to the reaction mixture at the conclusion of the polymerization, but before any material such as water, acid, or alcohol is added to inactivate or remove the lithium atoms present in the polymer.

Reacting the tetrapolymer with lithium terminated rubbery polymers introduces long chain branching into the polymer and reduces cold flow which in turn improves processing. For example, styrene is polymerized first, then butadiene is polymerized and the unterminated butadiene-styrene copolymer is finally coupled with the tetrapolymer. The resulting product is a radial block polymer which has a very high green tensile strength.

The tetrapolymer of this invention can also be used as an adhesive, for example, as a solution (such as 2–10 weight percent) in organic solvent. The tetrapolymer can be applied to substrates such as glass, metal, paper, fabric, leather, wood, rubber, plastics and the like. Teflon can be used as a substrate with the tetrapolymer adhesive of this invention without any prior surface treating step. Normally, Teflon requires a surface treatment step before conventional adhesives can be employed.

Minor amounts of the tetrapolymer can also be incorporated into polyvinyl chloride, for example in about 2 to 20 weight percent, usually by a dry blend procedure. The resulting composition has higher clarity, better aging stability, higher elongation and higher impact strength than polyvinyl chloride alone.

The advantages of this invention are further illustrated by the following examples. The reactants, proportions, and other specific conditions are presented as being typical and should not be construed to unduly limit the invention.

EXAMPLE I

Runs were conducted in which phthalic anhydride, tetrahydrofuran, epichlorohydrin, and phenyl isocyanate were polymerized with triisobutylaluminum. The polymerization recipe is shown below and the results are shown in Table 1.

Polymerization Recipe

|  | Moles |
|---|---|
| Phthalic Anhydride (PA) | 0.06 |
| Tetrahydrofuran (THF) | 0.38 |
| Epichlorohydrin (ECH) | 0.06 |
| Phenyl isocyanate (PI) | variable |
| Triisobutylaluminum (TBA) | 0.003 |
| Temperature, ° F. | 158 |
| Time, hours | 17.5 |

| Run No. | Phenyl Iso-Cyanate, Moles | Inherent Viscosity$^{(a)}$ | Polymer Elemental Analysis | | | | | |
|---|---|---|---|---|---|---|---|---|
| | | | O, % (b) theory | found | Cl, % (b) theory | found | N, % (b) theory | found |
| 1 | 0.003 | 0.09 | 25.3 | 25.3 | 11.1 | 10.5 | 0.22 | 0.23 |

| | | | | | | | |
|---|---|---|---|---|---|---|---|
| 2 | 0.009 | 0.11 | 24.9 | 24.5 | 10.7 | 10.4 | 0.62 0.65 |
| 3 | 0.030 | 0.08 | 23.6 | 22.6 | 9.5 | 8.0 | 1.9 1.8 |
| 4 | 0.060 | 0.09 | 22.1 | 22.5 | 8.2 | 7.3 | 3.2 3.1 |

(a) Determined in tetrahydrofuran solvent according to the procedure of U.S. Pat. No. 3,278,508, column 20, notes a and b. All polymers were gel free.
(b) Theoretical (calculated) values were based on the following assumptions: a 1/1/1 combining molar ratio of PA/THF/ECH, 100% conversion of the monomers, PA, ECH, and PI.

In these runs phthalic anhydride was charged to reactor first followed by the tetrahydrofuran and epichlorohydrin. Phenyl isocyanate was added next and the temperature adjusted to 158° F after which the catalyst, TBA, was added. At the conclusion of the polymerization period each polymerization mixture was shortstopped with a mixture of HCl and isopropyl alcohol and the polymer recovered from each mixture by coagulation with isopropyl alcohol. The polymer from each run was separated and dried at 140° under vacuum.

The results demonstrate that the phenyl isocyanate is essentially completely polymerized as shown by the elemental nitrogen analyses.

In this example the character of the tetrapolymer product changed from a very soft material to a friable solid with increasing phenylisocyanate. The melting point of the product was in the range from 55° to 60° C.

EXAMPLE II

Other runs were conducted employing succinic anhydride rather than phthalic anhydride in the polymerization recipe of Example I. The charging procedures and polymer recovery procedures employed in these runs were the same as those used in Example I. The results of these runs are shown in Table 2.

TABLE 2

| Run No. | Phenyl Iso- Cyanate, Moles | Inherent Viscosity | Polymer Elemental Analysis | | | | | |
|---|---|---|---|---|---|---|---|---|
| | | | O, % | | Cl, % | | N, % | |
| | | | theory | found | theory | found | theory | found |
| 1 | — | 0.12 | 30.2 | 28.2 | 13.4 | 12.4 | 0.00 | 0.05 |
| 2 | 0.003 | 0.13 | 30.1 | 28.1 | 13.1 | 11.4 | 0.26 | 0.10 |
| 3 | 0.006 | 0.11 | 29.4 | 27.9 | 12.8 | 11.7 | 0.52 | 0.45 |
| 4 | 0.009 | 0.09 | 29.1 | 28.3 | 12.6 | 12.0 | 0.74 | 0.85 |
| 5 | 0.030 | 0.06 | 26.6 | 27.6 | 10.9 | 10.7 | 2.2 | 1.7 |
| 6 | 0.060 | 0.04 | 24.6 | 26.4 | 9.2 | 9.0 | 3.7 | 4.1 |

Again, the results in Table 2 demonstrate that the phenyl isocyanate is polymerized in those runs where it was added as the fourth monomer.

Reasonable variations and modifications can be made in this invention without departing from the spirit or scope thereof.

Having described our invention that which is claimed is:

1. A process for the production of a tetrapolymer prepared by polymerizing a mixture consisting of a cyclic ether, an organic acid anhydride, an oxirane and a monoisocyanate in the presence of a trialkylaluminum as catalyst comprising introducing into a reaction zone said cyclic ether, said organic acid anhydride, said oxirane and said monoisocyanate to thus form said mixture wherein the molar ratio of said cyclic ether to said organic acid anhydride to said oxirane is in the range of 0.1:1:0.6 to 1:1:1.4 and wherein the weight ratio of said monoisocyanate to the combined weights of said cyclic ether, said organic acid anhydride and said oxirane is in the range of 1 to 80 parts by weight monoisocyanate per 100 parts by weight of the combined weights of said cyclic ether, said organic acid anhydride and said oxirane; reacting said mixture in the presence of said catalyst in said reaction zone for a time and at a temperature sufficient to produce said tetrapolymer; and thereafter recovering said tetrapolymer; wherein: (A) said cyclic ether is at least one compound of the general formula $$R-\overset{H}{\underset{|}{C}}-O-\overset{H}{\underset{|}{C}}-R \quad \begin{pmatrix} R \\ | \\ C \\ | \\ R \end{pmatrix}_z$$

wherein R is selected from the group consisting of hydrogen, chloromethyl, bromomethyl, and alkyl radicals having one to six carbon atoms, and z is the integer 1 or 2; (B) said organic acid anhydride is a cyclic carboxylic acid anhydride selected from the group consisting of malonic anhydride, succinic anhydride, glutaric anhydride, adipic anhydride, pimelic anhydride, glutaconic anhydride, maleic anhydride, phthalic anhydride, tetrachlorophthalic anhydride, 3-nitrophthalic anhydride, allylsuccinic anhydride, pyromellitic dianhydride, chloroendic anhydride, and endic anhydride; (C) said oxirane is at least one compound of the general formula $$R''-\overset{R'''}{\underset{|}{C}}-\overset{R'''}{\underset{|}{C}}-R'' \qquad \diagdown O \diagup$$

containing two to 20 carbon atoms per molecule wherein each $R''$ and $R'''$ is selected from the group consisting of hydrogen, saturated aliphatic, saturated cycloaliphatic, monoolefinic aliphatic, diolefinic aliphatic, monoolefinic cycloaliphatic, diolefinic cycloaliphatic, aromatic radicals and combinations thereof, halogen-substituted members thereof, and members thereof containing oxygen in the form of an acyclic ether linkage (—O—), a further oxirane group $$(-\overset{|}{C}-\overset{|}{C}-) \quad \diagdown O \diagup$$

or wherein both $R'''$ radicals form a divalent aliphatic hydrocarbon radical bound to the carbon atoms of the oxirane group to form a cycloaliphatic nucleus containing from four to 10 carbon atoms; and (D) said monoisocyanate is at least one compound of the group represented by the general formula $R^4NCO$ wherein $R^4$ is selected from alkyl, cycloalkyl, aryl, and alkenyl radicals and combinations thereof having two to 20 carbon atoms.

2. The process of claim 1 wherein said molar ratio is in the range of 1:1:1.

3. The process of claim 2 wherein an excess quantity of said cyclic ether is utilized in said reaction zone as a diluent.

4. The process of claim 1 wherein said temperature is in the range of 30° to 500° F., said time is in the range from 1 minute to 240 hours, and said catalyst is triisobutylaluminum.

5. The process of claim 1 wherein said cyclic ether is tetrahydrofuran, said anhydride is phthalic anhydride, said oxirane is epichlorohydrin, and said monoisocyanate is phenylisocyanate.

6. The process of claim 5 wherein said anhydride is succinic anhydride.

7. The tetrapolymer produced according to the process of claim 1.

8. The tetrapolymer produced according to the process of claim 5.

9. The tetrapolymer produced according to the process of claim 6.

* * * * *